Figure 5:
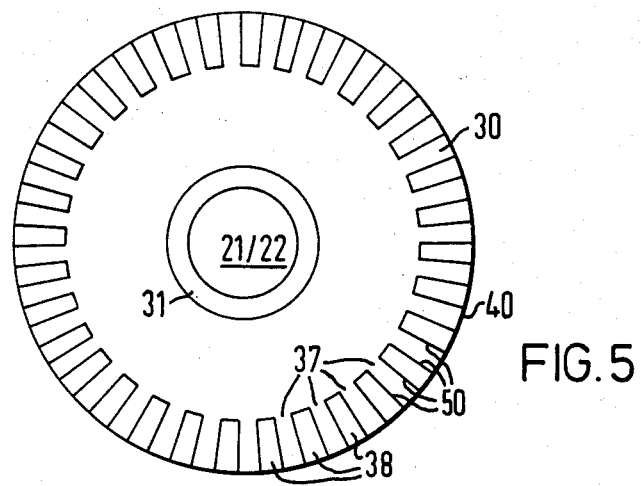

United States Patent [19]

Hackett

[11] Patent Number: 4,513,928
[45] Date of Patent: Apr. 30, 1985

[54] MAGNETIC TAPE CASSETTE
[75] Inventor: Joseph Hackett, Dublin, Ireland
[73] Assignee: Eko Video Limited, Ireland
[21] Appl. No.: 491,747
[22] Filed: May 5, 1983
[30] Foreign Application Priority Data
May 6, 1982 [IE] Ireland ................................ 1086/82
[51] Int. Cl.³ ............................................. G11B 15/32
[52] U.S. Cl. ..................................... 242/198; 360/132
[58] Field of Search ................. 242/198, 199; 360/132
[56] References Cited
U.S. PATENT DOCUMENTS

| 2,206,032 | 7/1940 | Foster | 352/76 |
|---|---|---|---|
| 4,106,724 | 8/1978 | Higashida | 242/198 |
| 4,214,719 | 7/1980 | Kato | 242/198 |
| 4,232,840 | 11/1980 | Sugawara | 242/198 |
| 4,288,048 | 9/1981 | Sieben | 242/198 |

FOREIGN PATENT DOCUMENTS 501356 2/1939 United Kingdom ................ 242/198

Primary Examiner—John M. Jillions
Assistant Examiner—Leo J. Peters
Attorney, Agent, or Firm—Brady, O'Boyle & Gates

[57] ABSTRACT

A tape cassette for use in a magnetic recording/reproducing apparatus comprises a housing having top and bottom plates with a pair of tape reels rotatably accommodated side-by-side in the housing between the said plates, and a locking means comprising a plurality of recesses formed on the outside peripheral surface of one flange of each tape reel and at least one locking lever having a pair of brake members extending mutually away from one another across the respective peripheral edges of the tape reel flanges. The locking lever(s) are pivoted with respect to the housing and are resiliently biased for rotation in such a direction that the brake members are brought towards the respective tape reel flanges into locking engagement with respective recesses of the reels when the cassette is not in its position of use. The cassette housing has an aperture for a release pin which, upon insertion of the cassette into its position of use in the apparatus, is operative to rotate the lever(s) in opposition to the resilient bias to disengage the brake members from the tape reels.

7 Claims, 21 Drawing Figures

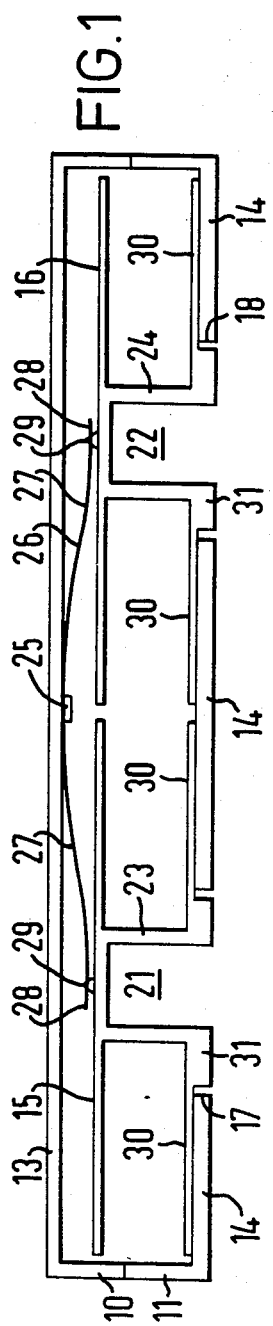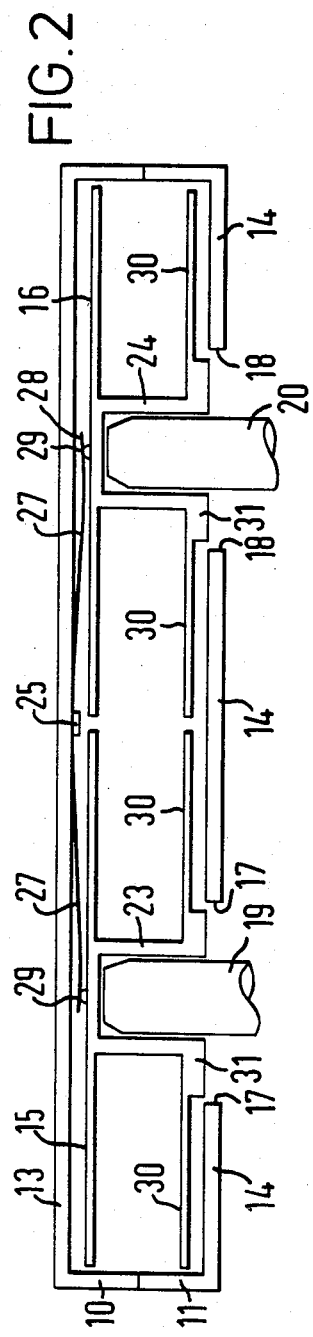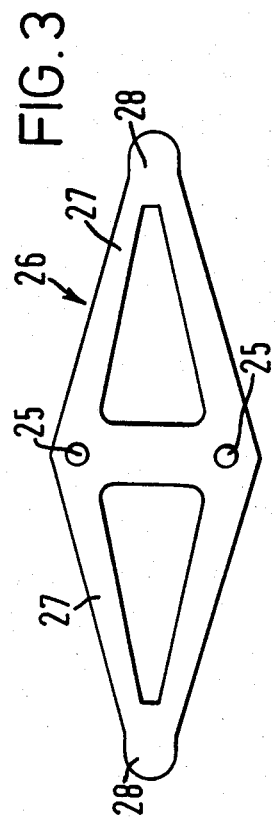

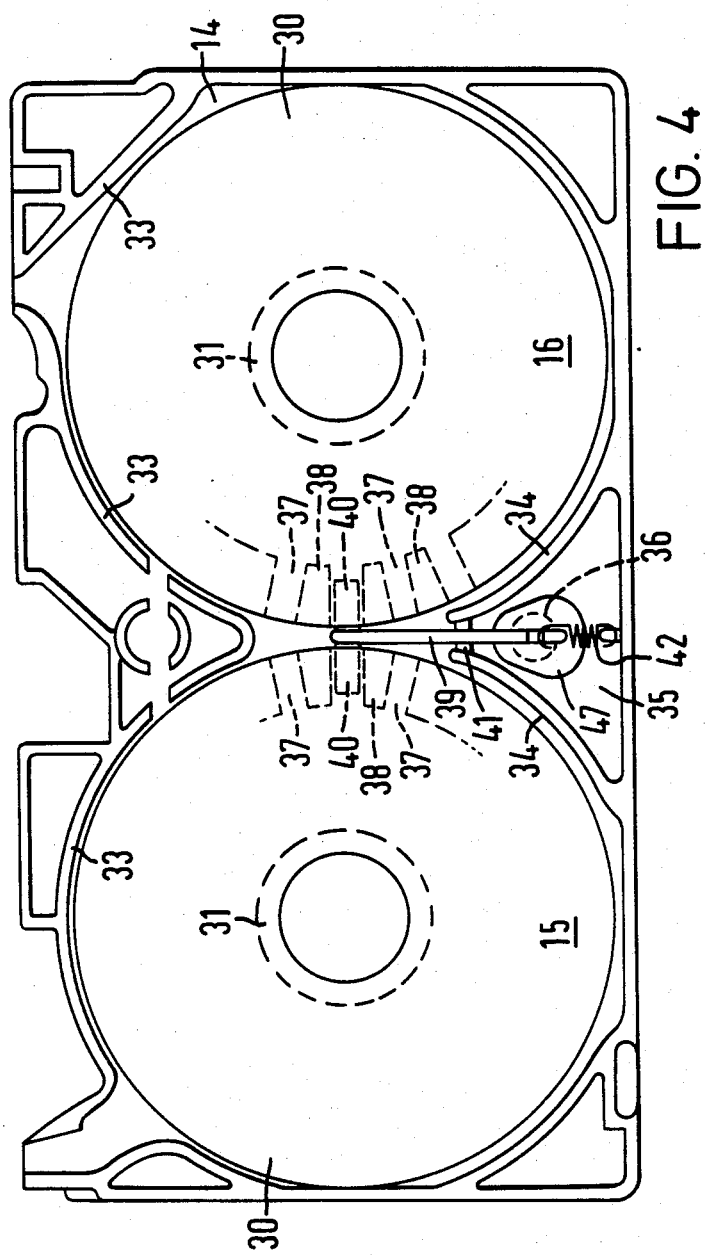

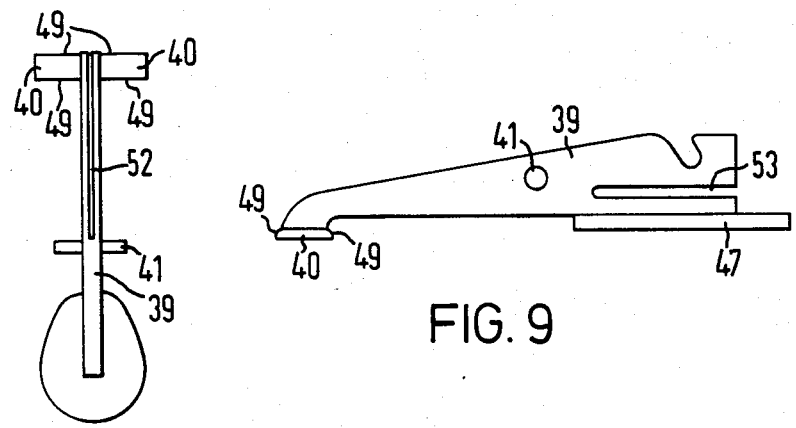
FIG. 8
FIG. 9
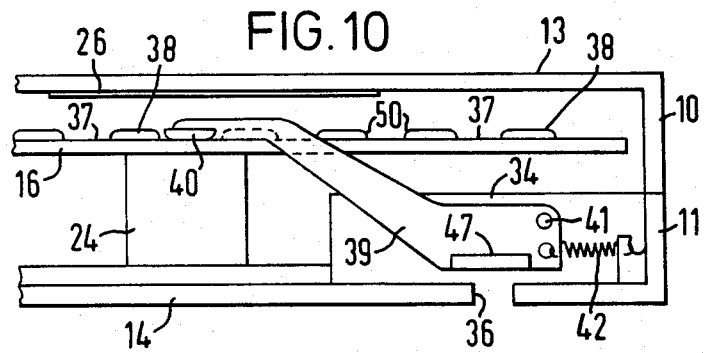
FIG. 10
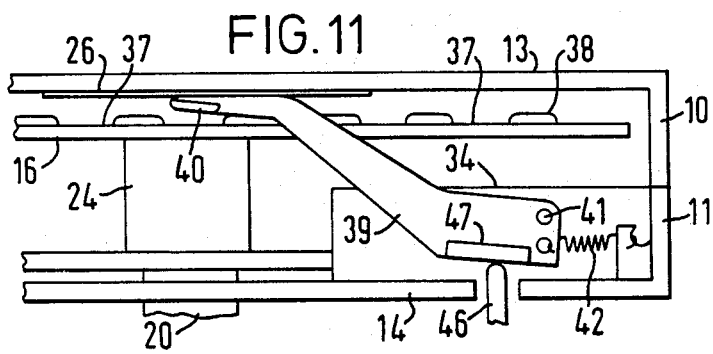
FIG. 11

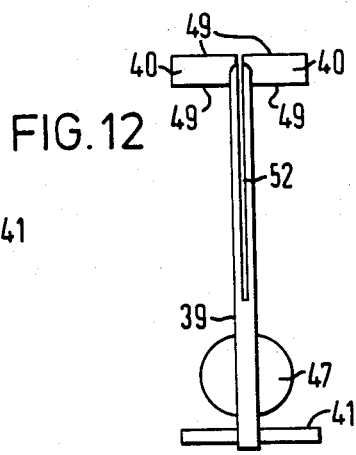
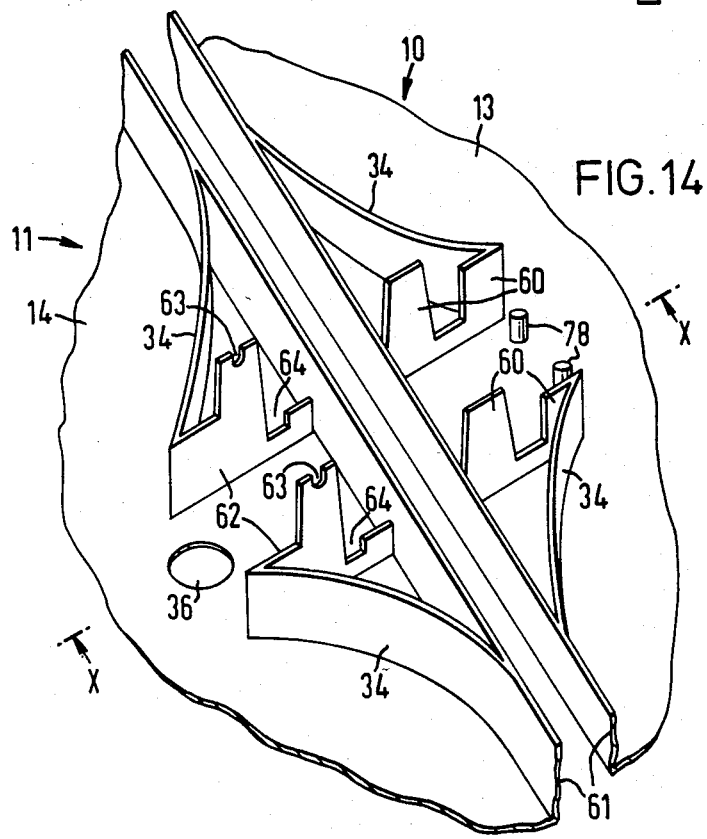

MAGNETIC TAPE CASSETTE

This invention relates to a tape cassette for use in a magnetic recording/reproducing apparatus, the cassette being of the kind comprising a housing having top and bottom plates with a pair of tape reels rotatably accommodated side-by-side in the housing between the said plates, a pair of spaced apertures in the bottom plate permitting entry into the housing of a pair of reel-engaging shafts of the said apparatus when the cassette is inserted into its position of use in the apparatus, and locking means automatically effective when the cassette is removed from the apparatus for substantially preventing inadvertent rotation of the reels when the cassette is not in its position of use.

Cassettes of the above kind have gained wide acceptance for use with domestic video recorders, in particular recorders of the kind operating according to the VHS and Betamax formats—see for example U.K. Patent Specification No. 1 580 394 and the article "Videoview—Uncomplicated Cassettes" in the magazine "Video Today", February 1981, pp 44 and 45.

The locking means described in U.K. Patent Specification No. 1 580 394 comprises a pair of brake levers which are normally spring-biassed into engagement with teeth provided in the peripheral edge of the bottom flange of each tape reel, the reels being released upon insertion of the cassette into the associated apparatus by a release pin which enters a small hole in the bottom plate of the cassette housing.

There are, however, a number of problems with this arrangement which may result in damage to the tape. For example, the teeth on the bottom flange of each tape reel may cause edge damage to the tape resulting in sound distortion or even a complete loss of sound. The video signal may also be distorted, and there may be a loss of synchronization. Furthermore, there may be damage to the oxide surface of the tape caused by the brake levers or the sharp edges in the cassette housing in the region of the locking mechanism scraping the tape. Also, the locking mechanism uses small moving parts and if any of these should become dislocated or broken considerable damage can be caused, particularly during fast forward and rewind operations by such parts becoming entangled in the tape at high speed and damaging components of the cassette. Since these cassettes are not user-servicable, and video tape cannot be spliced, the result may be a complete loss of the tape cassette.

While U.K. Patent Specification No. 1 580 394 basically describes a VHS format cassette, similar problems are encountered with the Betamax cassette described in the article in "Video Today" which also uses brake levers and toothed tape reels. It is therefore an object of the present invention to provide a construction of magnetic tape cassette, particularly but not exclusively for video use, in which these problems are mitigated.

Accordingly, the present invention provides a tape cassette for use in a magnetic recording/reproducing apparatus, the cassette being of the kind comprising a housing having top and bottom plates with a pair of tape reels rotatably accommodated side-by-side in the housing between the said plates, a pair of spaced apertures in the bottom plate permitting entry into the housing of a pair of reel-engaging shafts of the said apparatus when the cassette is inserted into its position of use in the apparatus, and locking means automatically effective when the cassette is removed from the apparatus for substantially preventing inadvertent rotation of the reels when the cassette is not in its position of use, the locking means comprising a plurality of recesses formed on the outside surface of one flange of each tape reel adjacent the peripheral edge thereof, and at least one locking lever having a pair of brake members extending mutually away from one another across the respective peripheral edges of the tape reel flanges each for engagement with any recess of a respective tape reel, the lever(s) being pivotted with respect to the housing and being resiliently biassed for rotation in such a direction about the pivotal axis that the brake members are brought towards the respective tape reel flanges into locking engagement with respective recesses of the reels when the cassette is not in its position of use, and the cassette housing having an aperture for a release pin which upon insertion of the cassette into its position of use in the apparatus is operative to rotate the lever(s) in opposition to the resilient bias to disengage the brake members from the tape reels.

The primary advantage of the invention is the simplicity of the locking mechanism, comprising one or at most two spring-biassed levers which act on the outer surface of the tape reel flanges and thus avoid the need for teeth in the peripheral edges of the tape reels. Furthermore, in the region of the locking mechanism the internal walls of the cassette housing may be continuously curved and do not require apertures to accommodate the brake levers of the prior art. Finally, since the brake members are disposed on the opposite side of their respective tape reel flanges to the tape there is little likelihood of these members fouling or damaging the tape.

Figure 6:
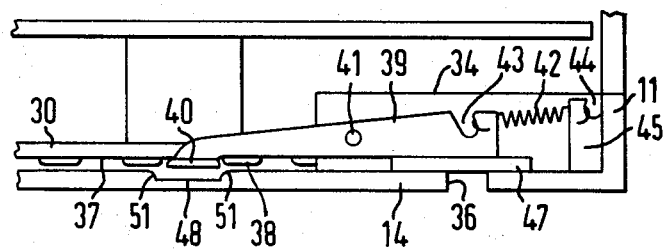
Figure 7:
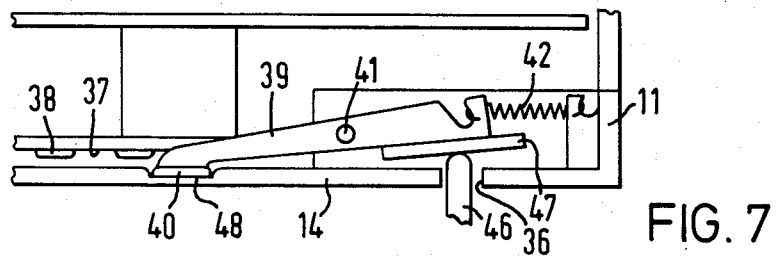

Embodiments of the invention will now be described, by way of example, with reference to the accompanying drawings, in which:

FIG. 1 is a cross-sectional view of a conventional VHS format cassette with the tape reels abutting the bottom plate of the housing in the non-use condition of the cassette, FIG. 2 is a cross-sectional view of the cassette of FIG. 1 when inserted in a recording/reproducing apparatus in its position of use, FIG. 3 is a plan view of the spring means of the cassette of FIGS. 1 and 2, FIG. 4 is a plan view of the interior of the lower housing half of a first embodiment of VHS cassette according to the invention, FIG. 5 is a bottom plan view of a tape reel for use in the cassette housing of FIG. 4, FIG. 6 is a side view of the locking means of the embodiment of the VHS cassette according to FIGS. 4 and 5 with the tape reels in a locked condition, FIG. 7 is a side view similar to FIG. 6 but with the tape reels in an unlocked condition, FIGS. 8 and 9 are plan and side views respectively of a modified form of locking lever, FIG. 10 is a side view of a locking means according to a second embodiment of the invention with the tape reels in a locked condition, the view being taken on a transverse cross-section of the housing between the tape reels.

Figure 15:
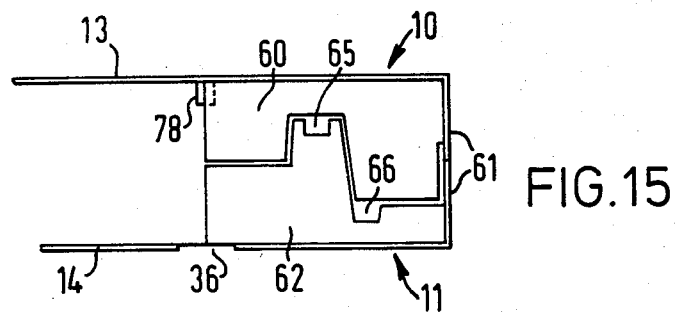
Figure 16:
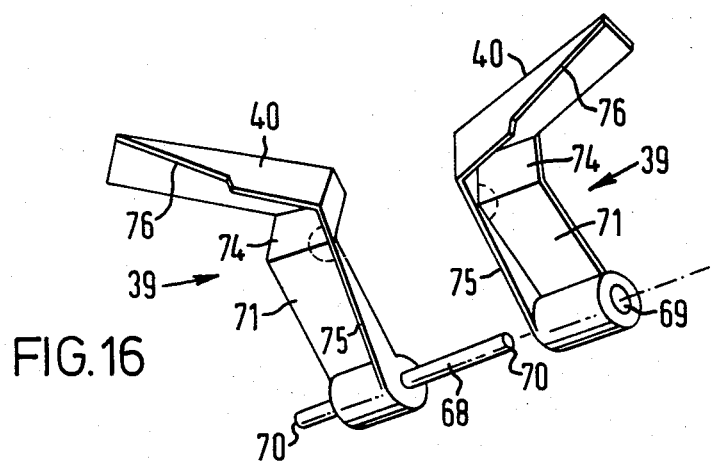
Figure 17:
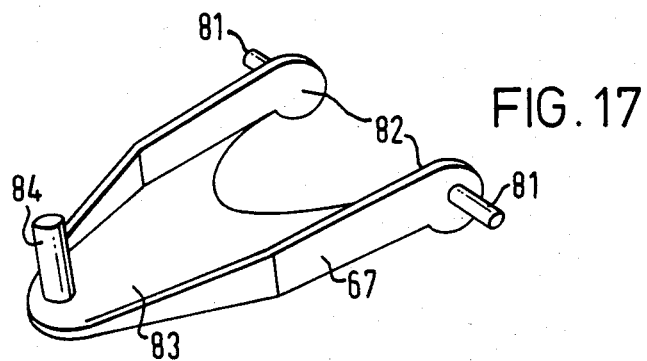
Figure 18:
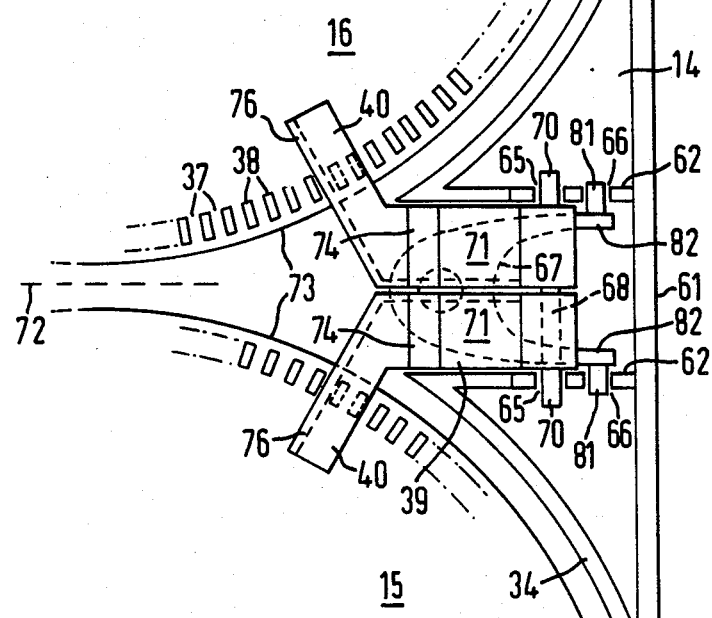
Figure 19:
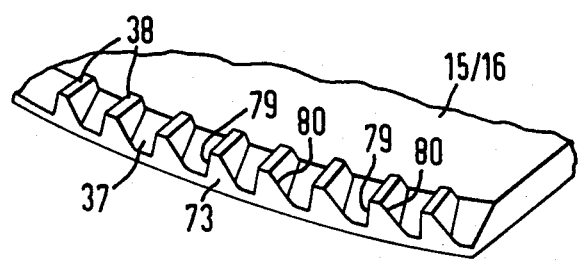
Figure 20:
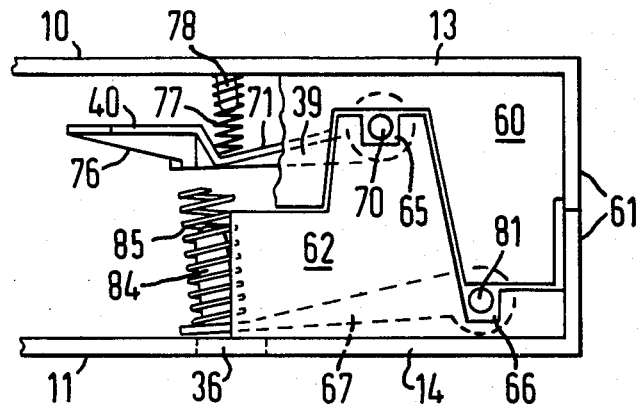
Figure 21:
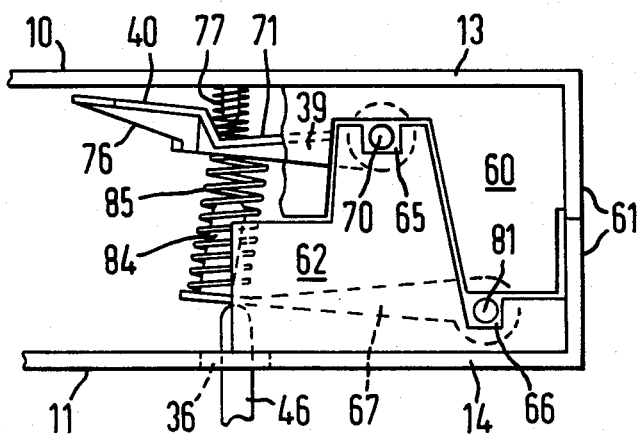

FIG. 11 is a similar side view of the locking means of FIG. 10 with the tape reels in an unlocked condition, FIGS. 12 and 13 are plan and side views respectively of a modified form of the locking lever used in FIGS. 10 and 11, FIG. 14 is a perspective view of the upper and lower housing halves in the region of the locking mechanism according to a third embodiment of the invention, FIG. 15 is a view taken on the line X—X of FIG. 14 when the housing halves are assembled, FIG. 16 is a detailed perspective view from beneath the locking levers of the third embodiment, FIG. 17 is a detailed perspective view from above of the actuator lever of the third embodiment, FIG. 18 is a plan view of the third embodiment of locking mechanism with the upper housing half removed, FIG. 19 is a detailed view of the upper surface of part of the edge of a tape reel flange, and FIGS. 20 and 21 are side views of the locking mechanism in its locked and unlocked conditions respectively.

FIGS. 1 and 2 show, in longitudinal cross-section taken on a plane passing through the rotational axis of the tape reels, a conventional VHS video cassette. The cassette comprises upper and lower housing halves 10 and 11 respectively which are joined together in conventional manner to form the complete housing having substantially parallel top and bottom plates 13 and 14 respectively. A pair of tape reels 15 and 16 are rotatably accommodated side-by-side in the housing between the top and bottom plates. The bottom plate 14 comprises a pair of spaced circular apertures 17 and 18 which permit entry into the housing of a pair of reel-engaging shafts 19 and 20 (FIG. 2) of the recording/reproducing apparatus with which the cassette is used, the shafts entering respective apertures 21 and 22 in the hubs 23 and 24 of the tape reels. Although not shown, the shafts 19, 20 and the hub apertures 21, 22 have complementary formations (e.g. splines and grooves) which ensure a driving engagement between each shaft and the associated tape reel.

The top plate 13 has secured thereto at 25 a leaf spring 26 (see also FIG. 3) having two oppositely directed apertured arms 27 whose free ends 28 bear upon small pips 29 disposed centrally on the upper ends of the tape reel hubs. The leaf spring 26 biasses each tape reel downward towards the bottom plate 14, so that when the cassette is not in its position of use in associated recording/reproducing apparatus, FIG. 1, the bottom flange 30 of each tape reel bears against the inside surface of the bottom plate 14. In this position the reels are capable of a limited degree of lateral movement in the housing, the circular apertures 17 and 18 having slightly greater diameter than the external diameter of an annular boss 31 depending from each tape reel hub into the respective aperture 17 or 18. The tape reels are also capable of limited axial movement in the housing upwardly against the bias of the spring 26.

When the cassette is inserted into its position of use in the associated apparatus, FIG. 2, the shafts 19 and 20 of the apparatus enter the hub apertures 21 and 22 of the tape reels and push the reels upwardly against the bias of the spring 26 out of contact with the bottom plate 14 and towards the top plate 13. During their entry into the hub apertures 21, 22 the shafts 19 and 20 centre the reels, and the bias of the spring 26 ensures proper (i.e. full and secure) engagement of the shafts 19 and 20 with the hubs 23 and 24 respectively.

The cassette described above is typical of the standard commercial VHS format cassette as described in the above-mentioned documents, and therefore only those parts of the cassette which are deemed relevant in regard to the embodiment of the invention to be described below are shown. Further details of the construction of such cassettes may be found in the above-mentioned documents, or by examination of any commercially available VHS format cassette.

As mentioned above, such cassettes include a locking mechanism which is automatically effective when the cassette is withdrawn from its position of use in the associated apparatus to substantially prevent inadvertent and unwanted rotation of the reels. The aforementioned U.K. Patent specification No. 1 580 394 describes one widely used locking mechanism—however, this mechanism suffers from the disadvantages mentioned previously. Accordingly, FIGS. 4 to 7 illustrate an embodiment of the invention which avoids these disadvantages by using a quite different kind of locking mechanism.

Apart from the novel locking mechanism, the video cassette of FIGS. 4 to 7 may in all other respects be of conventional design for the VHS format, and therefore like reference numerals have been used in FIGS. 4 to 7 for parts which perform the same function as parts of FIGS. 1 to 3. As before, components not relevant to the present invention are not described but may be ascertained from the current state of the art.

FIG. 4 is a plan view of the lower housing half 11 of the cassette according to the embodiment of the invention, incorporating as before the bottom plate 14 with circular apertures 17 and 18 (not shown in FIG. 4) for the reel-engaging shafts 19 and 20. The layout of the various internal walls of the housing, such as those shown at 33, is typical of the standard VHS format cassette and do not need further description. The walls 34 are, however, of interest as they define the region 35 which, in the prior VHS cassette shown in the article in "Video Today", accommodates the reel locking mechanism. In the case of the present locking mechanism the walls 34 may be continuously curved rather than apertured for the brake levers as shown in the above-mentioned article. These curved continuous walls 34, together with their mating counterparts in the upper housing half (not shown in the Figures), minimise the risk of warp of the cassette housing in this region and ensure that this region of the housing has no internal sharp edges. However, the usual aperture 36 for the brake release pin of the recording/reproducing apparatus is retained. FIG. 4 also shows the bottom flange 30 of each tape reel 15 and 16 in position in the lower housing half 11.

In the present embodiment the locking mechanism comprises a plurality of radial recesses 37 formed on the outside (under) surface of the bottom flange 30 of each tape reel 15 and 16, the recesses 37 being equiangularly disposed around each bottom flange 30 adjacent the peripheral edge thereof. As shown, the recesses 37 are in fact defined by the spaces between radial ribs or spokes 38 on the underside of the tape reel, but they could alternatively be formed directly in the bottom flange provided this has sufficient thickness to accommodate them.

The locking mechanism further includes a locking lever 39 of plastics material which extends generally in a direction normal to a line joining the rotational axes of the reels 15 and 16, the lever 39 extending from within the region 35 through the gap between the forward ends of the walls 34 to terminate at a position between the two reels at their closest approach. The forward (free) end of the lever 39 between the two reels comprises a pair of brake members 40 extending laterally in opposite directions across the respective peripheral edges of the tape reel flanges each for engagement with any recess of a respective tape reel, as shown in plan view in FIG. 4.

The lever 39 is pivotted with respect to the housing by means of a pivot pin 41 which extends through aligned apertures in the lever 39 and the forward ends of the walls 34 between which the lever 39 passes. The lever 39 is resiliently biassed for rotation about the pivotal axis of the pin 41 by a tension spring 42 which is stretched between a hook formation 43 at the rear end of the lever and a similar hook formation 44 on a post 45 integral with the bottom housing half 11, see particularly FIGS. 6 and 7.

The operation of the locking mechanism is as follows. When the cassette is withdrawn from its position of use in the associated recording/reproducing apparatus (FIG. 6), the bias of the spring 42 rotates the lever 39 about the axis of the pivot pin 41 in such direction that the brake members 40 are brought into locking engagement with respective recesses 37 of the reels 15 and 16. This locking action is assisted by the downward force of the spring 26 (FIG. 3) on the top of the reels. If a recess 37 does not exactly overly one of the brake members 40 when the cassette is withdrawn, the associated tape reel may move slightly in one direction or another until proper engagement is effected; however, such movement is minimized by providing a large number of closely spaced recesses 37.

However, when the cassette is inserted into its position of use in the associated recording/reproducing apparatus (FIG. 7), the release pin 46 of such apparatus enters the aperture 36 in the bottom plate 14 of the housing and engages the lever 39 on the opposite side of the pin 41 to the brake members 40. The engagement is by way of an integral pad or plate 47 formed on the underside of the lever 39, such plate normally covering the aperture 36 when the cassette is not in use (FIG. 6). The result is that the lever 39 is rotated against the bias of the spring 42 so that the brake members 40 disengage the recesses 37 of the reels 15 and 16, and enter a recess 48 formed in the bottom plate 14 of the housing. The disengagement is assisted by the upward movement of the tape reels 15 and 16 caused by the entry of the shafts 19 and 20 into the hub apertues 21 and 22 of the reels (FIG. 2). Nevertheless, it is preferred that the longitudinal edges 49 of the brake members 40, the radial edges 50 of the recesses 37, and the edges 51 of the recess 48 be rounded so as to reduce shock forces and possible fracturing of these components should the recess 48 or the brake members 40 be inadvertently contacted by the underside of either tape reel when the locking mechanism is disengaged, particularly during high speed forward or reverse winding.

FIGS. 8 and 9 are plan and side views respectively of a modified form of the locking lever 39. The differences are two-fold. First, FIG. 8, the portion of the lever 39 beyond the pin 41 is bifurcated by a vertical slot 52 to permit a degree of independent flexing of each brake member 40 so that each may efficiently engages its respective reel even though these may be at slightly different heights in the housing. Second, FIG. 9, the portion of the lever behind the pin 41 is horizontally slotted at 53 so that the pad or plate 47 may flex to a limited degree relative to the main part of the lever 39 to accommodate tolerances and provide cushioning for the release pin 46.

FIGS. 10 to 13 illustrate a second embodiment of the invention in which the radial recesses are formed on the outside surface of the top flange of each tape reel, rather than on the outside surface of the bottom flange of each reel as in the first embodiment, with an appropriate design of the locking lever.

The general background to the second embodiment and the kind of tape cassette to which it relates is fully described earlier, especially with respect to FIGS. 1 to 3, and therefore the description of FIGS. 10 to 13 will only deal with the manner in which the present embodiment of locking means differs from that described earlier. FIGS. 10 to 13 of the present embodiment correspond generally to FIGS. 6 to 9 of the earlier embodiment, and therefore the same reference numerals have been used for component parts which are the same as, or perform a similar function to, components of the earlier embodiment.

The primary differences between the present locking means and that described in the earlier embodiment are as follows:

(a) The radial recesses 37 (defined by the ribs 38) are now provided on the top side of each tape reel 15 and 16; i.e. they are formed adjacent the peripheral edge of the outside (upper) surface of the top flange of each tape reel. Apart from this, however, they have the same distribution as that shown in FIG. 5 of the earlier embodiment for the underside of the bottom flange.

(b) The locking lever 39 is angled upwardly between the tape reels so that the two brake members 40 at the free end of the lever 39 extend laterally on each side above the tape reels. Apart from this, the brake members 40 bear (in plan view) the same positional relationship to the peripheral recesses 37 on the upper surface of the top tape reel flanges as is borne by the similar members 40 to the recesses 37 on the under surface of the bottom tape reel flanges in FIG. 4 of the earlier embodiment.

(c) The relative positions of the pivot pin 41 and the point contacted by the release pin 46 are selected in accordance with the direction of the tension force exerted by the spring 42 to provide rotation from the locked condition (FIG. 10) to the unlocked condition (FIG. 11) in a clockwise direction as viewed in the Figures, as contrasted with the anti-clockwise direction of rotation of the locking lever shown in FIGS. 4 and 5 of the earlier embodiment. This is necessary of course since in the present case the brake members 40 must be biassed downwardly into the locking position, whereas in the earlier embodiment the brake members must be biassed upwardly. In particular, the pivot pin 41 has been moved behind the point contacted by the release pin 46, and above the point engaged by the spring 42. This contrasts with the position of the pin 41 in front of the point contacted by the release pin 46 and below the point engaged by the spring 42 in the earlier embodiment.

The operation of the locking mechanism is as follows. When the cassette is withdrawn from its position of use in the associated recording/reproducing apparatus (FIG. 10), the bias of the spring 42 rotates the lever 39 anti-clockwise about the axis of the pivot pin 41 such that the brake members 40 are brought downwardly into locking engagement with respective recesses 37 of the reels 15 and 16. If a recess 37 does not exactly overly one of the brake members 40 when the cassette is withdrawn, the associated tape reel may move slightly in one direction or another until proper engagement is effected; however, such movement is minimized by providing a large number of closely spaced recesses 37.

However, when the cassette is inserted into its position of use in the associated recording/reproducing apparatus (FIG. 11), the release pin 46 of such apparatus enters the aperture 36 in the bottom plate 14 of the housing and engages the lever 39 on the same side of the pin 41 as the brake members 40. The engagement is by way of an integral pad or plate 47 formed on the underside of the lever 39. The result is that the lever 39 is rotated clockwise against the bias of the spring 42 so that the brake members 40 disengage the recesses 37 of the reels 15 and 16, and the free end of the lever 39 comes to bear upon the underside of the centre of the leaf spring 26.

FIGS. 12 and 13 are plan and side views respectively of a modified form of the locking lever 39. The differences are two-fold. First, FIG. 12, the portion of the lever 39 adjacent the free end thereof is bifurcated by a vertical slot 52 to permit a degree of independent flexing of each brake member 40 so that each may efficiently engage its respective reel even though these may be at slightly different heights in the housing. Second, FIG. 13, the portion of the lever in front of the pin 41 is horizontally slotted at 53 so that the pad or plate 47 may flex to a limited degree relative to the main part of the lever 39 to accommodate tolerances and provide cushioning for the release pin 46.

It is to be understood that in both this and the earlier embodiment the shape of the locking lever 39 and the position of the pin 41 may be varied provided that the correct rotational direction of bias is provided by the spring 42. Furthermore, in some instances it may be more convenient to use a compression spring or other resilient compression member for the resilient bias of the locking lever, provided the force exerted thereby is applied at the correct point and in the correct direction in relation to the pin 41.

FIGS 14 to 21 (which are not all to the same scale) illustrate a third embodiment of the invention which, like the second embodiment, operates on the upper surface of the top flange of each tape reel, but which uses two locking levers 39 pivotted side-by-side. As before, the general background to this third embodiment is described in relation to FIGS. 1 to 3, and where appropriate the same reference numberals have been used as in the previous embodiments for the same or similar components.

Referring first to FIGS. 14 and 15, the upper and lower housing halves 10 and 11 are shown in the region of the walls 34 between which the locking mechanism is located as before, the walls 34 being continuously curved with no apertures. It is to be understood that FIG. 14 shows the housing halves 10 and 11 opened out and laid side-by-side in the manner of a book; when the housing halves are assembled one upon the other the exposed edges of the walls 34 mate to form a continuous wall extending the full height of the housing. The bottom plate 14 of the lower housing half 11 has the release pin aperture 36 in the conventional position.

The housing half 10 further has a pair of parallel walls 60 extending normally to the longitudinal edge 61 of the cassette housing, and the housing half 11 has a pair of parallel walls 62 also extending normally to the edge 61. The walls 60 and 62 are of generally complementary shape with the exception that the walls 62 have pairs of recesses 63 and 64. When the two housing halves are assembled together, FIGS. 15, 20 and 21, the exposed edges of the walls 60 and 62 mate to define pairs of bearing apertures 65 and 66 for the locking levers 39 and an actuator lever 67 as will be described.

The locking levers 39, FIGS. 16, 18, 20 and 21, are independently pivotally mounted side-by-side about a common pivotal axis. The common pivotal axis is defined by a pin 68 integral with one of the levers 39 and passing freely through an aperture 69 in the other lever. The ends 70 of the pin 68 are received in the bearing apertures 65. The common axis defined by the pin 68 and apertures 65 is parallel to both the longitudinal edge 61 of the housing and a notional line joining the rotational axes of the two tape spools, and is located near the housing top plate 13 and adjacent the edge 61 relative to the overall dimensions of the housing.

Each lever 39 comprises a first portion 71 adjacent the common pivotal axis which extends normally thereto partially towards the said notional line joining the rotational axes of the tape spools, the levers 39 being symmetrically arranged relative to the centre line 72 between the spools. Each lever 39 further includes an integral second portion constituting the brake member 40, which portions 40, just beyond the forward edge of the walls 34, extend mutually away from one another at an angle to the portions 71 so as to extend radially across the peripheral edge 73 of a respective tape reel top flange 15 and 16. The portions 71 and 40 are verticlaly offset by a transition piece 74, and are reinforced by downwardly extending webs 75 and 76 on the underside.

Each locking lever 39 is resiliently biassed downwardly by an individual compression spring 77 compressed between the top plate 13 and the portion 71 at its junction with the transition piece 74, see FIGS. 20 and 21. The springs 77 are retained in position by respective locating pins 78 (see also FIG. 14) moulded to the inside surface of the top plate 13. As an alternative the springs 77 may be moulded integral with inside surface of the top plate 13 and the spring locating pins 78 may be omitted. In the absence of an upward counter-force the springs 77 cause the webs 76 of the brake members 40 to engage in one of the recesses 37 formed on the upper surface of the top flange 15 and 16 of each tape reel.

As before, the recesses 37 are defined by the gaps between radial ribs 38 arranged equi-angularly around the circumference of each flange 15 and 16 adjacent the peripheral edge 73. A preferred form of ribs 38 and recesses 37 is illustrated in FIG. 19 where it will be seen that the ribs 38 are more in the nature of closely spaced teeth. Each such tooth is of generally sawtooth cross-section, having a generally vertical face 79 on one side and an inclined face 80 on the other. This helps in locating the webs 76 in the recesses 37. The recesses 37 are downwardly inclined in the radially outward direction as shown to match the inclination of the webs 76 which can be seen in FIGS. 16, 20 and 21. It will of course be understood that ribs 38 and recesses 37 may have a standard configuration with vertical faces rather than the face format 79,80 shown in the drawing FIG. 19.

The position thus described, with the webs 76 of the brake members 40 engaging a respective recess 37 on each tape reel flange 15 and 16 corresponds to the locked condition of the tape reels. This locked condition is shown in the side view of FIG. 20, except that to simplify the Figure the tape reels have been omitted together with the wall 34 and part of the wall 60.

In order to effect unlocking of the tape reels upon insertion of the release pin 46 (FIG. 21) into the aperture 36, an actuator lever 67 is provided below the levers 39, see FIGS. 17, 18, 20 and 21. The actuator lever 67 is of generally wishbone configuration with a pair of coaxial pivot pins 81 extending outwardly in opposite directions from the free ends 82. The pins 81 are received in the bearing apertures 66 and together with the latter define a pivotal axis for the lever 67 which is parallel to the common pivotal axis of the levers 39. However, the pivotal axis of the lever 67 is located near the bottom plate 14 of the cassette housing, but, like the common axis of the levers 39, adjacent the same edge 61 of the housing.

The actuator lever 67 has a plate-like portion 83 which extends over the release pin aperture 36, so that the lever 67 will be rotated upwardly by the release pin 46 when the cassette is inserted into its associated apparatus, FIG. 21. The portion 83 carries an integral post 84 which locates a coil spring 85. As an alternative the spring 85 may be moulded integral with the portion 83 and the spring locating post 84 may be omitted. The upward rotation of the lever 67 by the pin 46 causes the upper end of the coil spring 85, which in the absence of the pin 46 is spaced by a small distance from the underside of the levers 39 as shown in FIG. 20, to be pressed in common against the underside of each lever 39, in particular in the region defined by dashed semi-circles in FIG. 16. The pressure of the spring 85, which is substantially greater than the combined pressure of the much smaller springs 77, causes the latter to be compressed and the brake members 40 forced up against the top plate 13 of the cassette housing. This causes the webs 76 to disengage the recesses 37 so that the tape reels are free to rotate.

This is the unlocked condition of the tape reels shown in FIG. 21. Again, to simplify the figure the tape reels have not been shown and the wall 34 omitted. The use of the spring 85 between the actuator lever 67 and the locking levers 39, rather than a rigid member, permits a relaxation of the tolerances in the manufacture of the mechanism as the distance between the levers 67 and 39 does not have to be so precisely defined.

Clearly, upon removal of the cassette from its apparatus and consequent removal of the release pin 46 from the aperture 36, the levers 39 are once more pushed downwardly by the biassing springs 77 and the mechanism automatically assumes the locked condition.

The locking levers 39 and the actuator 67 as shown in FIGS. 16 and 17 are moulded as integral components of plastics material similar to that conventionally used for the moulding of the cassette housing.

While the invention has been described primarily in terms of a cassette of VHS format, the invention is also applicable to other kinds of tape cassette, particularly but not exclusively to Betamax format cassettes.

What is claimed is:

1. A tape cassette for use in a magnetic recording/reproducing apparatus, the cassette being of the kind comprising a housing having top and bottom plates with a pair of tape reels rotatably accommodated side-by-side in the housing between the said plates, a pair of spaced apertures in the bottom plate permitting entry into the housing of a pair of reel-engaging shafts of the said apparatus when the cassette is inserted into its position of use in the apparatus, and locking means automatically effective when the cassette is removed from the apparatus for substantially preventing inadvertent rotation of the reels when the cassette is not in its position of use, the locking means comprising a plurality of recesses formed on the outside surface of one flange of each tape reel adjacent the peripheral edge thereof, a pair of locking levers independently pivoted side-by-side about a common pivoted axis, said pair of locking levers having a pair of brake members, one on each locking lever extending mutually away from one another across the respective peripheral edges of the tape reel flanges each for engagement with any recess of a respective tape reel, means pivotally mounting the pair of locking levers with respect to the housing for rotation about an axis non-parallel to the rotational axes of the tape reels, means resiliently biasing the pair of levers for rotation in such a direction about the pivotal axis that the brake members are brought towards the said outside surfaces of the respective tape reel flanges into locking engagement with respective recesses of the reels when the cassette is not in its position of use, and an aperture in the cassette housing for a release pin which upon insertion of the cassette into its position of use in the apparatus is operative to rotate the pair of levers in opposition to the resilient biasing means to disengage the brake members from the tape reels, whereby each locking lever comprises a respective brake member.

2. A tape cassette as claimed in claim 1, wherein the common pivotal axis is substantially parallel to a notional line joining the rotational axes of the two tape reels, and wherein the recesses are formed on the upper surface of the top flange of each tape reel, the resilient biassing means biassing each locking lever downwardly for engagement of the respective brake member with any recess on the upper surface of the respective top flange.

3. A tape cassette as claimed in claim 2 wherein each brake member includes a web on the underside thereof, the web engaging the recesses of the respective tape reel flange.

4. A tape cassette as claimed in claim 2, wherein the common pivotal axis of the locking levers is located adjacent and substantially parallel to one longitudinal edge of the housing, and wherein each locking lever includes a first portion adjacent the common pivotal axis which extends substantially normally thereto partially towards the said line joining the rotational axes of the tape reels, and a second portion, consitituting the brake member, angularly offset from the first portion and extending substantially radially across the peripheral edge of the respective tape reel flange.

5. A tape cassette as claimed in claim 2, further including an actuator lever and means mounting the actuator lever below the locking levers for rotation about a pivotal axis substantially parallel to the common pivotal axis of the locking levers, the pivotal axis of the actuator lever being located adjacent the same longitudinal edge of the housing as the common pivotal axis of the locking levers, the actuator lever having a portion extending over the release pin aperture for upward rotation of the actuator lever by the release pin when the cassette is inserted into its position of use in the recording/reproducing apparatus, the actuator lever further including means for pushing the locking levers upwards against the said downward bias for release of the tape reels when the release pin is inserted in the said release pin aperture.

6. A tape cassette as claimed in claim 5, wherein the means pivotally mounting the locking levers and the actuator lever in the housing comprises pivot pins which are located in bearing apertures defined by generally complementary mating edges of internal walls of the housing associated with the top and bottom housing plates respectively.

7. A tape cassette as claimed in claim 5, wherein the means for pushing the locking levers upwards comprises a resilient member carried by the actuator lever.

* * * * *